(12) United States Patent
Yang et al.

(10) Patent No.: US 12,544,731 B2
(45) Date of Patent: Feb. 10, 2026

(54) COAL TO ACETYLENE PLASMA REACTOR HAVING COKING INHIBITION AND ONLINE DECOKING FUNCTIONS

(71) Applicants: XINJIANG YUEHETAI CHEMICAL TECHNOLOGY CO., LTD., Xinjiang (CN); ZHEJIANG UNIVERSITY, Hangzhou (CN)

(72) Inventors: Qiwei Yang, Hangzhou (CN); Guangdong Wen, Xinjiang (CN); Qilong Ren, Hangzhou (CN); Ming Zhang, Xinjiang (CN); Rulong Li, Xinjiang (CN); Jianhua Wu, Xinjiang (CN); Zhongbiao Wu, Hangzhou (CN); Xinzhi Chen, Hangzhou (CN); Fengqiu Chen, Hangzhou (CN); Chaohong He, Hangzhou (CN)

(73) Assignees: XINJIANG YUEHETAI CHEMICAL TECHNOLOGY CO., LTD., Karamay (CN); ZHEJIANG UNIVERSITY, Hangzhou (CN)

( * ) Notice: Subject to any disclaimer, the term of this patent is extended or adjusted under 35 U.S.C. 154(b) by 942 days.

(21) Appl. No.: 17/777,048

(22) PCT Filed: Sep. 24, 2020

(86) PCT No.: PCT/CN2020/117382
§ 371 (c)(1),
(2) Date: May 15, 2022

(87) PCT Pub. No.: WO2021/093470
PCT Pub. Date: May 20, 2021

(65) Prior Publication Data
US 2022/0401911 A1    Dec. 22, 2022

(30) Foreign Application Priority Data

Nov. 14, 2019 (CN) .......................... 201911113539.7

(51) Int. Cl.
*B01J 19/08* (2006.01)
*B08B 9/093* (2006.01)

(52) U.S. Cl.
CPC ............. *B01J 19/087* (2013.01); *B08B 9/093* (2013.01); *B01J 2219/0894* (2013.01)

(58) Field of Classification Search
CPC ............. B01J 19/087; B01J 2219/0894; B01J 19/088; B01J 19/26; B01J 2219/00166;
(Continued)

(56) References Cited

U.S. PATENT DOCUMENTS 4,864,096 A * 9/1989 Wolf ..................... H05H 1/3405
219/121.36
6,395,197 B1 * 5/2002 Detering .................. C01B 3/34
252/373
(Continued)

FOREIGN PATENT DOCUMENTS

CN    1562922    1/2005
CN    1907926    2/2007
(Continued)

*Primary Examiner* — Xiuyu Tai
(74) *Attorney, Agent, or Firm* — Jiwen Chen; Joywin IP Law PLLC

(57) ABSTRACT

The present invention discloses a coal-to-acetylene plasma reactor having coking inhibition and online decoking functions, comprising a vertically arranged cathode rod, an anode and a circulating cooling water jacket arranged outside the anode, the anode includes from top to bottom an anode of the electric arc operation section for cooperating with the cathode rod to generate an electric arc, and an anode of the reaction section located below the electric arc, the anode is grounded, the inner diameter of the anode of the reaction section is 1.2 to 10 times the inner diameter of the anode of the electric arc operation section, and the junction of the anode of the reaction section and the anode of the electric arc operation section is circumferentially provided (Continued)

with a decoking nozzle that can spray a decoking medium toward the anode of the reaction section. The present invention uses the method of changing the inner diameter of the reactor and setting nozzles for diaphragm protection, fundamentally suppressing or even eliminating the coking phenomenon during the operation of the reactor, no need to set the decoking cycle, and realizing the continuous cracking operation of the reactor.

10 Claims, 4 Drawing Sheets

(58) Field of Classification Search
CPC ...... B01J 2219/0879; B01J 2219/00108; B01J 2219/00159; B01J 2219/0875; B01J 2219/0898; B01J 2219/00132; B01J 2219/00103; B01J 2219/00094; B01J 2219/0845; B01J 2219/0809; B01J 2219/083; B01J 2219/00119; B01J 2219/0826; B01J 19/08; B01J 2219/0869; B01J 2219/0871; B08B 9/093; C01B 3/34; C01B 32/05; C01B 3/24; H01M 8/0618; C04B 35/00; B82Y 30/00; B22F 3/003; B22F 2999/00; B22F 2202/13; Y02P 20/129; Y02E 60/50; H05H 1/32; H05H 1/3405; H05H 1/3421
See application file for complete search history.

(56) References Cited

U.S. PATENT DOCUMENTS

2010/0048975 A1   2/2010  Uhm et al.
2011/0186419 A1*  8/2011  Song ............... B01J 19/088
                                              977/773

FOREIGN PATENT DOCUMENTS

| | | |
|---|---|---|
| CN | 101372630 | 2/2009 |
| CN | 101487596 | 7/2009 |
| CN | 201940403 U | 8/2011 |
| CN | 104353403 | 2/2015 |
| CN | 105561903 | 5/2016 |
| CN | 108201868 | 6/2018 |
| CN | 104056829 | 9/2018 |
| JP | 2006202605 | 8/2006 |

* cited by examiner

COAL TO ACETYLENE PLASMA REACTOR HAVING COKING INHIBITION AND ONLINE DECOKING FUNCTIONS

This is a U.S. national stage application of PCT Application No. PCT/CN2020/117382 under 35 U.S.C. 371, filed Sep. 24, 2020 in Chinese, claiming priority to Chinese Patent Applications No. 201911113539.7, filed Nov. 14, 2019, all of which are hereby incorporated by reference.

TECHNICAL FIELD

The present invention relates to the technical field of coal chemical industry, in particular to a coal-to-acetylene plasma reactor having coking inhibition and online decoking functions.

DESCRIPTION OF RELATED ART

Since the 1950s, plasma pyrolysis of coal for acetylene technology has received extensive worldwide attention. The technology mainly utilizes the characteristics of high temperature, high enthalpy and rich active particles of thermal plasma, the pulverized coal is passed directly into the plasma or its jet, it is rapidly heated and pyrolyzed in the millisecond time scale, volatiles are released, and a cracking reaction occurs to generate gas. After quenching, a cracked gas with acetylene as the main component is obtained. The whole process does not produce any wastewater or solid pollutants, and it is a clean and efficient coal conversion process.

Domestic and foreign universities, enterprises and even government departments have carried out attempts and research on plasma pyrolysis of coal for acetylene technology, The United States, Germany and China have established 1-5 MW plasma pyrolysis of coal for acetylene pilot plants respectively. It is a useful attempt to prove the technical feasibility of the technology. However, these studies were forced to stop after the pilot scale, mainly because it was difficult to solve the problem of coking, and the long-term stable operation of the reactor could not be realized.

After the pulverized coal enters the plasma reactor, it is heated by the plasma or its jet to generate a pyrolysis reaction. Through several mechanisms such as catalytic coking, gas-phase coking and free radical coking, coking of different morphology, structure and degree of graphitization is formed in the part below the arc. The coke reduces the inner diameter of the reactor, increases the gas flow blocking force, and destroys the operating stability of the reactor system, making it impossible to achieve long-term stable operation, which limits the industrial application of this technology. Therefore, researchers at home and abroad have tried a variety of coke removal methods: Du Zhiguo et al. (CN101372630A) adopted the method of periodically spraying water vapor to periodically remove the coke on the reactor wall. Ren Qilong et al. (CN104056829B) proposed a method of using carbon dioxide as a decoking gas, carbon dioxide reacted with carbon, the main element of the coke, to generate carbon monoxide, which would not have a great impact on the flow rate and composition of the cracked gas, and had the advantages of short decoking time and high decoking efficiency, and more safety. Guo Wenkang et al. (CN201940403U) designed a mechanical decoking device in a carbon conversion reactor, which did not introduce additional gas, did not destroy the components of the reaction gas, and did not increase the subsequent gas separation work, so the cracking device could be in continuously operation, prolonged the service life of the reactor, improved the reliability of work, and optimized the design, operation control and temperature measurement of the reactor.

However, there are many problems with the decoking method currently used. For example, although the effect of steam decoking method is relatively good, the energy consumption is relatively high, the injected steam may cause a short circuit in the reactor and affect the production safety. Oxygen, used as a decoking medium, has a huge safety hazard in hydrogen plasma atmosphere. Since water vapor, oxygen, carbon dioxide and other media will react with the raw coal and affect the decoking process, it is necessary to carry out the alternate operation of cracking-decoking-cracking, which will cause large fluctuations in the flow rate and composition of cracked gas, which will cause great pressure on the subsequent gas-solid/gas separation system. Therefore, an efficient and safe decoking method is crucial to the vitality of plasma pyrolysis of coal for acetylene technology.

SUMMARY OF THE INVENTION

Aiming at the deficiencies in the art, the present invention provides a coal-to-acetylene plasma reactor having coking inhibition and online decoking functions, using the method of changing the inner diameter of the reactor and setting nozzles for diaphragm protection, fundamentally suppressing or even eliminating the coking phenomenon during the operation of the reactor, no need to set the decoking cycle, and realizing the continuous cracking operation of the reactor.

A coal-to-acetylene plasma reactor having coking inhibition and online decoking functions, comprising a vertically arranged cathode rod, an anode and a circulating cooling water jacket arranged outside the anode, the anode includes an anode of the electric arc operation section for cooperating with the cathode rod to generate an electric arc, and an anode of the reaction section located below the electric arc from top to bottom, the anode is grounded, the inner diameter of the anode of the reaction section is 1.2 to 10 times the inner diameter of the anode of the electric arc operation section, and the junction of the anode of the reaction section and the anode of the electric arc operation section is circumferentially provided with a decoking nozzle that can spray a decoking medium toward the anode of the reaction section.

When the coal-to-acetylene plasma reactor is in operation, pulverized coal can be added from the top of the reactor or the cathode can be set to be hollow for the pulverized coal to be added. The electric arc is generated between the cathode and the anode to form a high temperature area, after the pulverized coal enters the plasma reactor, it is heated by the plasma or its jet to generate a pyrolysis reaction. The inner diameter of the anode of the reaction section below the electric arc operation section is expanded to 1.2-10 times that of the electric arc operation section, due to inertia, most of the high-temperature gas and solid particles will continue to go straight down, and a very small part will diffuse outward, since the inner diameter has been enlarged, the probability of this part of the solid particles contacting the wall to form coking has also been greatly reduced.

During the decoking nozzle spraying the decoking medium, the pulverized coal can continue to enter the reactor for cracking, which will not interrupt or affect the continuous operation of the reactor itself. The decoking medium is water (liquid), carbon dioxide or water vapor.

Preferably, the decoking medium is water. The decoking nozzle sprays water on the anode of the reaction section, and a water film is formed on the anode surface of the reaction section to remove the decoking produced during the operation of the reactor at any time.

Preferably, the outer side of the anode of the electric arc operation section is provided with a coil that can generate a magnetic field when it is energized, and the electric arc forms a magnetic rotating arc under the action of the magnetic field.

Preferably, the number of the decoking nozzle is 6 to 36, which are evenly distributed along the circumferential direction of the anode.

The operating modes of the decoking nozzle are as follows:

A. Continuously spraying the decoking medium to the anode of the reaction section, and the decoking medium forms a diaphragm on the anode surface of the reaction section, preventing the high-temperature solid particles contacting the anode surface of the reaction section from forming coke.

B. Intermittently spraying the decoking medium to the anode of the reaction section to regularly remove the coke formed on the surface of the anode of the reaction section. Since the anode of the reactor is grounded and the potential is 0, the decoking medium sprayed by the nozzle arranged on the wall of the anode will not affect the insulation of the reactor, thereby ensuring the safety of the reactor operation.

Preferably, the operation mode of the decoking nozzle is intermittent spraying of the decoking medium. When the decoking medium is water, continuous water spray will cause part of acetylene to react with water to generate carbon monoxide, thereby reducing the yield of acetylene. The intermittent spraying of the decoking medium can not only ensure the acetylene yield, but also cooperate with the expansion design to suppress coke formation and effectively decoke, and is more energy-saving and water-saving.

Preferably, the spraying interval time of the intermittent spraying of the decoking medium is 25-35 minutes, and the duration of the spraying of the decoking medium is 2 to 3 minutes.

According to the gas flow rate before the diameter expansion, a quenching nozzle can be set after a certain distance after the diameter expansion to reduce the temperature of the high-temperature gas and solid particles to below 700 K, making acetylene the dominant gas product. For convenience, the bottom of the anode of the reaction section is provided with a quenching nozzle, which can spray a quenching medium for cooling the reaction product. The quenching medium can be water, hydrocarbons, hydrogen and other media. By adjusting the position of the quenching nozzle, the residence time of the raw material can be controlled and the product composition can be adjusted.

Preferably, the inner diameter of the anode of the reaction section is 1.5 to 3.0 times the inner diameter of the anode of the electric arc operation section, which can not only effectively control the formation of coke, but also reduce the quenching pressure caused by too large diameter expansion.

Preferably, the decoking nozzle is communicated with the circulating cooling water jacket, and the decoking medium is circulating cooling water, no other equipment is required, and the existing structure of the plasma reactor is used as much as possible.

The water spraying condition of the decoking nozzle can be controlled by the water pressure, specifically, the water spraying can be controlled by adjusting the pressure of the circulating cooling water.

Preferably, the circulating cooling water jacket includes an independent circulating cooling water jacket in the electric arc operation section for cooling the anode of the electric arc operation section and a circulating cooling water jacket in the reaction section for cooling the anode of the reaction section. The temperature difference between the anode in the electric arc operation section and the anode in the reaction section is relatively large, and a better cooling effect can be obtained by using independent circulating cooling water jackets for cooling water circulation.

Considering various factors such as water temperature, as an option, the decoking nozzle is communicated with the circulating cooling water jacket in the electric arc operation section, which is convenient for design, and the circulating cooling water jacket in the electric arc operation section can be used to adjust the water pressure of the decoking nozzle when spraying water. The pressure of the inner water body reduces the application of external water pressure.

Compared with the prior art, the main advantages of the present invention include:

(1) The inner diameter of the reaction section below the electric arc operation section is enlarged, so that most of the solid particles cannot contact the inner wall surface to form coking.

(2) The wall of the expanded reactor is provided with a downward nozzle, and the decoking medium is continuously or intermittently sprayed down against the wall surface. The coke produced during the operation of the reactor is removed at any time.

DETAILED DESCRIPTION OF THE INVENTION

The present invention will be further described below with reference to the accompanying drawings and specific embodiments. It should be understood that these examples are only used to illustrate the present invention and not to limit the scope of the present invention. The operation method without specifying the specific conditions in the following examples is usually in accordance with the conventional conditions, or in accordance with the conditions suggested by the manufacturer.

Figure 1:
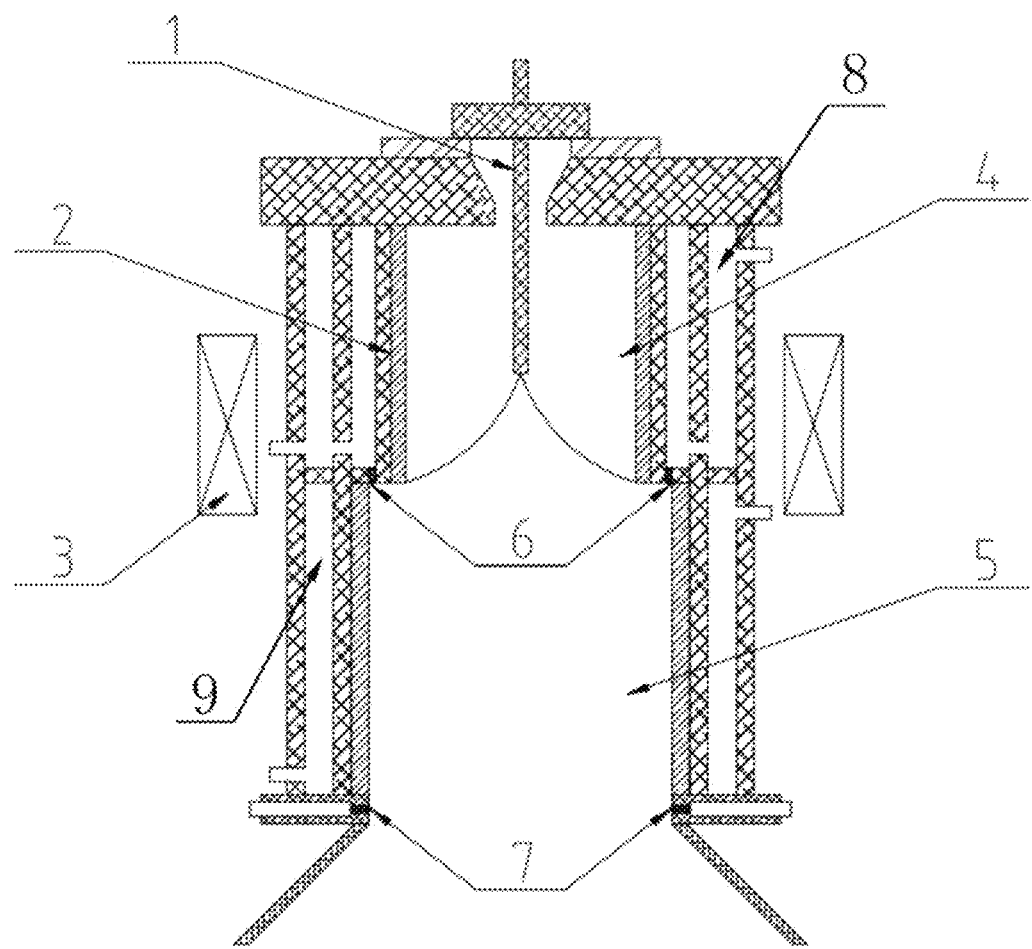
FIG. 1 is the structural schematic diagram of the coal to acetylene plasma reactor having coking inhibition and online decoking functions, in the FIG. 1: 1—cathode rod, 2—anode, 3—coil, 4—electric arc operation section, 5—reaction section, 6—decoking nozzle, 7—quenching nozzle; 8—circulating cooling water jacket in electric arc operation section; 9—circulating cooling water jacket in reaction section.

The coal-to-acetylene plasma reactor having coking inhibition and online decoking functions in this embodiment is shown in FIG. 1, comprises a cathode rod 1, an anode 2, a coil 3, a decoking nozzle 6 and a quenching nozzle 7.

The top cover of the reactor is open for the vertical insertion of the cathode rod 1 and the entry of pulverized coal.

The anode 2 is composed of an anode of the electric arc operation section connected up and down and coaxially arranged for cooperating with the cathode rod 1 to generate an electric arc, and an anode of the reaction section located below the electric arc. The anode of the electric arc operation section constitutes the inner wall of the electric arc operation section, which is cylindrical, and the area enclosed on the inner side is the electric arc operation section 4. The anode of the reaction section constitutes the inner wall of the reaction section, which is also cylindrical, and the area enclosed on the inner side is the reaction section 5. The anode 2 is grounded, and the inner diameter of the anode of the reaction section is 1.2 to 10 times the inner diameter of the anode of the electric arc operation section.

A circulating cooling water jacket is arranged on the outside of the anode 2, wherein the circulating cooling water jacket 8 in the electric arc operation section corresponds to the anode of the electric arc operation section, and the circulating cooling water jacket 9 in the reaction section corresponds to the anode of the reaction section. The circulating cooling water jacket 8 in the electric arc operation section and the circulating cooling water jacket 9 in the reaction section are independent of each other.

A coil 3 is arranged at the anode of the electric arc operation section outside the circulating cooling water jacket, which can generate a magnetic field when energized, and the electric arc forms a magnetic rotating arc under the action of the magnetic field, which stabilizes the arc at the end of the electric arc operation section.

There are 6 to 36 decoking nozzles 6 in total, and the number can be selected according to actual needs, which is evenly distributed along the circumference of the anode 2 at the junction of the anode of the reaction section and the anode of the electric arc operation section, that is, the top of the anode of the reaction section. The inlet of the decoking nozzle 6 is communicated with the circulating cooling water jacket 8 of the electric arc operation section, and the outlet is vertically downward, close to the anode of the reaction section, and can spray the circulating cooling water vertically downward.

There are at least two quenching nozzles 7, and the center is symmetrically arranged at the bottom of the anode of the reaction section, and cooling water can be sprayed to cool the reaction product, so that acetylene becomes the dominant gas product.

The working principle of the coal to acetylene plasma reactor having coking inhibition and online decoking functions is as follows:

While the reactor is running, pulverized coal can be added from the top of the reactor. The electric arc is generated between the cathode 1 and the anode 2 and rotates at a high speed under the action of a magnetic field to form a high temperature area. After the pulverized coal enters the plasma reactor, it is heated by plasma or its jet to generate a pyrolysis reaction. The inner diameter of the anode corresponding to the reaction section 5 below the electric arc operation section 4 is expanded to 1.2 to 10 times the inner diameter of the anode of the electric arc operation section, due to inertia, most of the high-temperature gas and solid particles will continue to go straight down, and a very small part will diffuse outward, since the inner diameter has been enlarged, the probability of this part of the solid particles contacting the wall to form coking has also been greatly reduced.

In addition, the decoking nozzle 6 sprays water toward the anode of the reaction section, and a water film is formed on the surface of the anode of the reaction section, so as to remove the coke formed during the operation of the reactor at any time. Moreover, during the water spraying of the decoking nozzle 6, the pulverized coal can continue to enter the reactor for cracking, which will not interrupt or affect the continuous operation of the reactor itself. Furthermore, the decoking nozzle 6 is communicated with the circulating cooling water jacket 8 in the electric arc operation section, and the sprayed water comes from the circulating cooling water, no other equipment is required, and the existing structure of the plasma reactor is used as much as possible. The water spraying condition of the decoking nozzle 6 can be controlled by the water pressure, specifically, the water spraying can be controlled by adjusting the pressure of the circulating cooling water.

Comparative Example 1

The inner diameter of the coal-to-acetylene reactor was 300 mm, and the anode variable diameter and decoking nozzle were not provided. The operation process was as follows:

Nitrogen arcing was conducted, after stable operation for 2 min, nitrogen and hydrogen conversion were conducted.

The pulverized coal feeding was turned on, the coal feeding amount was 5 tons/hour (t/h), and the operating power of the reactor was 10.3 MW.

After the pulverized coal was cracked for 30 minutes, the coal feeding was closed, and steam was introduced into the reactor to remove the coke at a flow rate of 1.5 t/h for 2 minutes.

The steam was turned off and coal was continuously fed.

The above-mentioned coal cracking-decoking cycle was repeated.

After 6 hours of operation, the arc was cut off and nitrogen replacement was turned on.

Figure 2:
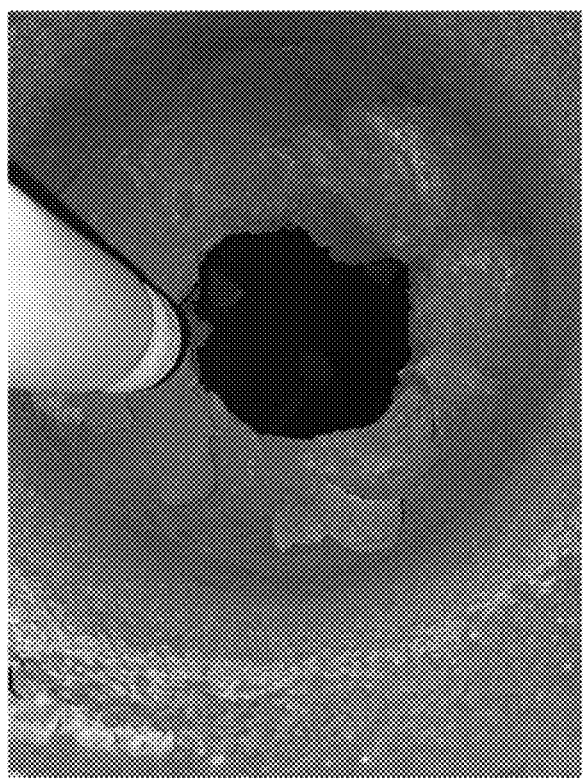
FIG. 2 is a photo of the coking situation on the inner wall of the reaction section after running for 6 hours under the conditions of Comparative Example 1.

The reactor was opened and the coking situation was investigated. The results were shown in FIG. 2, The coking was serious, and the effect of water vapor cleaning was not good.

Application Example 1

The coal to acetylene plasma reactor having coking inhibition and online decoking functions of the embodiment was used. The inner diameter of the electric arc operation section of the coal-to-acetylene reactor was 300 mm, the inner diameter of the reaction section was 450 mm, and a decoking nozzle was set.

Nitrogen arcing was conducted, after stable operation for 2 min, nitrogen and hydrogen conversion was conducted.

The pulverized coal feeding was turned on, the coal feeding amount was 5 t/h, and the operating power of the reactor was 10.4 MW.

After the pulverized coal was cracked for 30 minutes, the decoking nozzle was opened, and water was sprayed into the reactor to clean the coke at a flow rate of 180 kg/h for 2 minutes.

The steam was turned off and coal was continuously fed.

The above-mentioned coal cracking-decoking cycle was repeated.

After 6 hours of operation, the arc was cut off and nitrogen replacement was turned on.

Figure 3:
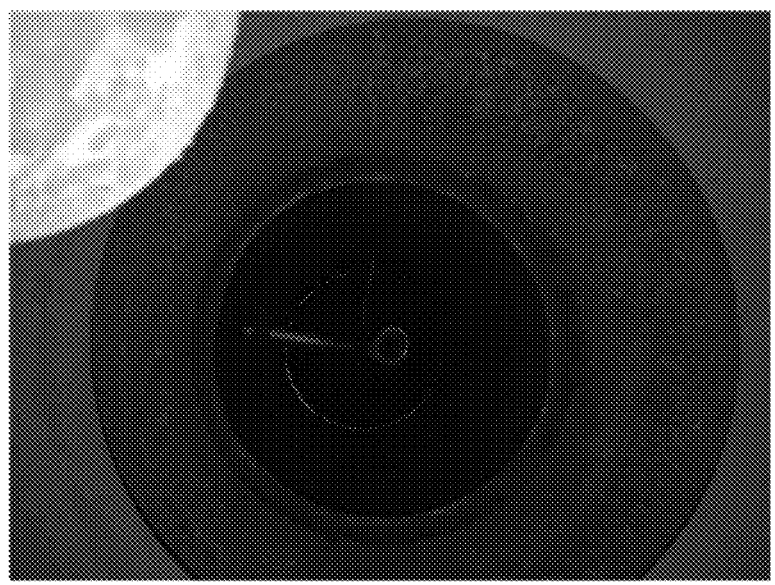
FIG. 3 and FIG. 4 are photos of the coking situation on the inner wall of the reaction section after intermittent coking operation for 6 hours under the conditions of Application Example 1.
Figure 4:

The reactor was opened and investigating the coking situation was investigated. The results were shown in FIGS. 3 and 4, there was no coking phenomenon in the reactor.

Application Example 2

The coal to acetylene plasma reactor having coking inhibition and online decoking functions of the embodiment was used. The inner diameter of the electric arc operation section of the coal-to-acetylene reactor was 300 mm, the inner diameter of the reaction section was 450 mm, and a decoking nozzle was set.

Nitrogen arcing was conducted, after stable operation for 2 min, nitrogen and hydrogen conversion were conducted.

The pulverized coal feeding was turned on, the coal feeding amount was 5 t/h, and the operating power of the reactor was 10.4 MW.

At the same time, the decoking nozzle was opened, and water was sprayed into the reactor, the flow rate is 120 kg/h.

After 6 hours of operation, the arc was cut off and nitrogen replacement was turned on.

Figure 5:
FIG. 5 is a photo of the coking situation on the inner wall of the reaction section after keeping the decoking nozzle running for 6 hours with continuous water spraying under the conditions of Application Example 2.

The reactor was opened and investigating the coking situation was investigated. The results were shown in FIG. 5, there was no coking phenomenon in the reactor.

In addition, it should be understood that after reading the above description of the present invention, those skilled in the art can make various changes or modifications to the present invention, and these equivalent forms also fall within the scope defined by the appended claims of the present application.

The invention claimed is:

1. A coal-to-acetylene plasma reactor having coking inhibition and online decoking functions, comprising a vertically arranged cathode rod, an anode and a circulating cooling water jacket arranged outside the anode, the anode comprising from top to bottom an anode of the electric arc operation section for cooperating with the cathode rod to generate an electric arc, and an anode of the reaction section located below the electric arc, wherein, the anode is grounded, an inner wall of the anode of the electric arc operation section is cylindrical, an inner wall of the anode of the reaction section is cylindrical, the inner diameter of the anode of the reaction section is 1.2 to 10 times the inner diameter of the anode of the electric arc operation section, and the junction of the anode of the reaction section and the anode of the electric arc operation section is circumferentially provided with a decoking nozzle that can spray a decoking medium toward the anode of the reaction section;

wherein, a top cover of the reactor comprises an opening for vertical insertion of the cathode rod and entry of pulverized coal, an entry direction of the pulverized coal is vertically straight down;

wherein, a bottom of the anode of the reaction section is provided with a quenching nozzle, which spray a quenching medium for cooling the reaction product.

2. The coal-to-acetylene plasma reactor having coking inhibition and online decoking functions according to claim 1, wherein, the decoking medium is water, carbon dioxide or water vapor.

3. The coal-to-acetylene plasma reactor having coking inhibition and online decoking functions according to claim 1, wherein, an outer side of the anode of the electric arc operation section is provided with a coil that can generate a magnetic field when it is energized, and the electric arc forms a magnetic rotating arc under the action of the magnetic field.

4. The coal-to-acetylene plasma reactor having coking inhibition and online decoking functions according to claim 1, wherein, the number of the decoking nozzle is 6 to 36, which are evenly distributed along the circumferential direction of the anode.

5. The coal-to-acetylene plasma reactor having coking inhibition and online decoking functions according to claim 1, wherein, the operation mode of the decoking nozzle is intermittent spraying of the decoking medium.

6. The coal-to-acetylene plasma reactor having coking inhibition and online decoking functions according to claim 5, wherein, spraying interval time of the intermittent spraying of the decoking medium is 25-35 minutes, and duration of the spraying of the decoking medium is 2 to 3 minutes.

7. The coal-to-acetylene plasma reactor having coking inhibition and online decoking functions according to claim 1, wherein, the decoking nozzle is communicated with the circulating cooling water jacket, and the decoking medium is circulating cooling water.

8. The coal-to-acetylene plasma reactor having coking inhibition and online decoking functions according to claim 1, wherein, the circulating cooling water jacket comprises an independent circulating cooling water jacket in the electric arc operation section for cooling the anode of the electric arc operation section and a circulating cooling water jacket in the reaction section for cooling the anode of the reaction section.

9. The coal-to-acetylene plasma reactor having coking inhibition and online decoking functions according to claim 8, wherein, the decoking nozzle is communicated with the circulating cooling water jacket in the electric arc operation section.

10. The coal-to-acetylene plasma reactor having coking inhibition and online decoking functions according to claim 7, wherein, the circulating cooling water jacket comprises an independent circulating cooling water jacket in the electric arc operation section for cooling the anode of the electric arc operation section and a circulating cooling water jacket in the reaction section for cooling the anode of the reaction section.

* * * * *